R. B. WILLIAMSON.
DYNAMO ELECTRIC MACHINE.
APPLICATION FILED APR. 8, 1910.
971,869.
Patented Oct. 4, 1910.
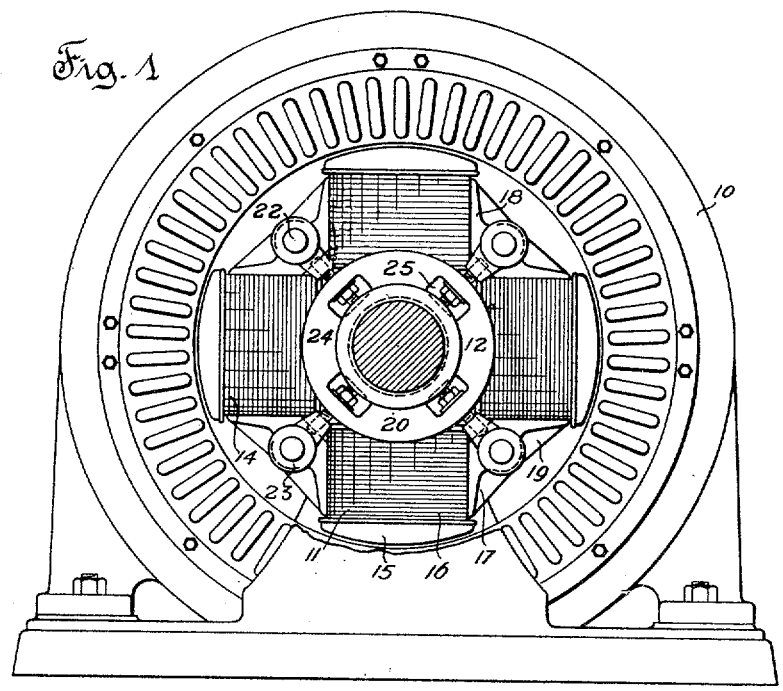
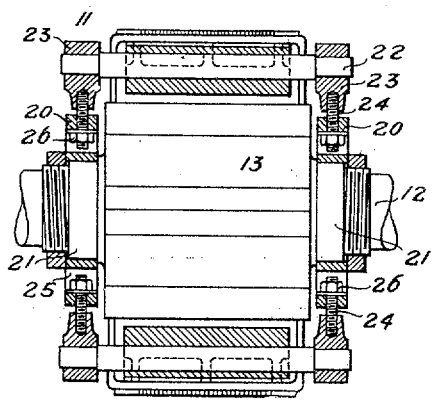
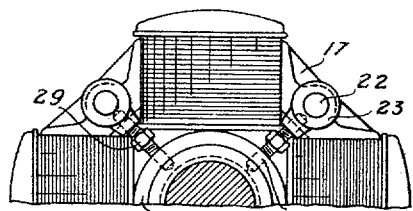
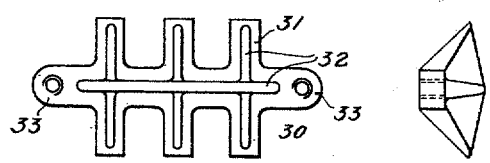
Witnesses
Rob. E. Hall
Chas. L. Byron
Inventor
Robert B. Williamson
By Chas. E. Lord
Attorney

UNITED STATES PATENT OFFICE.

ROBERT B. WILLIAMSON, OF MILWAUKEE, WISCONSIN, ASSIGNOR TO ALLIS-CHALMERS COMPANY, A CORPORATION OF NEW JERSEY.

DYNAMO-ELECTRIC MACHINE.

971,869.  Specification of Letters Patent.  Patented Oct. 4, 1910.

Application filed April 8, 1910. Serial No. 554,162.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines, and particularly to revolving field members of high speed alternators, such as turbo-generators.

In certain types of dynamo-electric machines and particularly in rotating field members of high speed machines, parts of the coils are under high stresses tending to distort and displace the coils. These stresses are especially large in high speed rotating field members having a small number of poles, for in such machines that component of the centrifugal force at right angles to the pole axis and tending to shift the side portions of the coil away from the pole, is very large.

To support and prevent displacement of the coils and particularly to prevent displacement of the side portions of the coils, coil bracing members have been employed, and these bracing members, each of which supports and braces the sides of the coils on two adjacent poles, are usually retained in position by fastening devices extending into the core of the rotating member. Such bracing members have not been satisfactory in all respects, for the reason that very frequently it is a difficult matter to apply them to the machine, and to tighten or adjust them, and it is often the case that the means for fastening them in position materially weakens the core.

The object of the present invention is to provide bracing means for the coils of field magnets, and to retain these bracing members in position independently of the core, and in a manner such that they are securely and effectively fastened in position and can be easily and quickly tightened or adjusted when adjustment is necessary.

In carrying out my invention, I apply the bracing members to the sides of the coils and fasten them in position so that they will not be displaced by centrifugal force, by annular members which are located at the sides of the field magnets or at the ends of the core, and to which the different coil bracing members are fastened. In a rotating field element, these annular members are preferably supported on the shaft at or adjacent the ends of the core, and the coil bracing members are fastened to them by adjustable means, such as bolts.

My invention may be further briefly summarized as consisting in certain novel details of construction, and combinations and arrangements of parts which will be described in the specification and set forth in the appended claims.

In the accompanying sheet of drawings, Figure 1 is a side elevation of a high speed alternator equipped with one embodiment of my invention; Fig. 2 is a partial section and partial elevation of a portion of the rotating field member and the coil bracing and supporting means therefor, the section being taken through two oppositely disposed bracing members, and two of the field magnets being removed from the core, which is shown in elevation; Fig. 3 is a partial side elevation of a rotary field member provided with a modified form of retaining means for the coil bracing members; Fig. 4 is a plan view of a modified form of coil bracing member; and Fig. 5 is an end view of the same.

Referring now to the figures of the drawing, 10 represents the stationary element of a dynamo-electric machine, which element in this case is the armature, and 11 represents the rotary element or rotary field member, which is mounted upon the shaft 12 and comprises a core 13 and field magnets 14, each including a pole 15 and a coil 16.

To relieve the side portions of the coils of the stresses tending to cause distortion and displacement, I employ between adjacent field magnets bracing members which in Figs. 1 and 3 are designated by the reference character 17. Each bracing member includes a pair of plates 18 which are, in this case, arranged at right angles to each other, and connecting ribs or webs 19, the plates 18 bearing against the adjacent sides of the coils of two field magnets. Instead of fastening the coil bracing members to the core 13, as in the usual constructions, I fasten them to supporting rings or annular members 20 which in the rotary field member, as here shown, are mounted upon portions 21 of the shaft 12. The bracing members may be secured to these rings 20 in a variety of ways, but in Figs. 1 and 2, pins or rods 22 which pass transversely through the webs 19 and extend beyond the field magnets and beyond the ends of the core, are provided at their free ends with members 23 which are located directly over the two rings 20 and are connected thereto by adjustable bolts 24. The members 23 have openings which receive the ends of the pins or rods 22 and have threaded sockets into which the bolts 24 are secured. The rings 20 are provided with suitable openings through which the bolts 24 loosely pass, and also with recesses 25 which receive the inner ends of the bolts and also adjusting nuts 26 mounted thereon.

It will be seen that the bracing members are so securely fastened to the rings 20 that there can be no outward displacement of the same, and at the same time they can be very easily applied to a machine. Furthermore, the individual bracing members can be separately tightened and adjusted in case adjustment should be necessary, because of shrinkage or other slight movement or shifting of a coil.

In Fig. 3, I have shown a slight modification of the invention. In this case the bracing members 17, pins 22 passing through the webs thereof, and the members 23 which are mounted upon the ends of the pins, may be of the same construction as shown in Fig. 1. Instead, however, of attaching the members 23 to the supporting rings by bolts and nuts such as shown in Fig. 2, these parts are in this case fastened together by bolts 28 which are provided with right and left hand threaded portions which are screwed into sockets in the members 23 and into the rings 27 and with a central enlargement 29 by means of which the bolts may be adjusted.

In Figs. 4 and 5, a modification of the coil bracing members is shown. In this case, the coil bracing member which is shown at 30 is provided with a series of coil bracing and supporting members 31 (corresponding to what I have called the plates 18 in the constructions shown in Figs. 1, 2 and 3), with ribs 32, and at the ends with outwardly projecting ears or lugs 33, which are adapted to be secured by suitable bolts directly to the rings mounted on the shaft, such as the rings 20 and 27, in the constructions previously described. With this construction, the transversely extending pins 22, and the members 23, which in the first described constructions are mounted on the ends of the pins, are done away with.

I do not desire to be confined to the exact details shown, but aim in my claims to cover all modifications which do not involve a departure from the spirit and scope of my invention.

Having described my invention, what I claim is:

1. In a dynamo-electric machine, an element having projecting poles and coils thereon, bracing members applied to the sides of the coils and located between adjacent poles, and means comprising a ring located at the side of the poles for holding the bracing members in position.

2. In a dynamo-electric machine, an element having projecting field magnets including poles and field coils thereon, bracing members for the sides of the coils, retaining members for the coil bracing members located at the sides of the field magnets, and means connecting the bracing members to the retaining members.

3. In a dynamo-electric machine, an element having projecting field magnets including poles and field coils thereon, bracing members for the sides of the coils, and rigid rings located on opposite sides of the field magnets and connected to the bracing members.

4. In a dynamo-electric machine, a rotary element comprising a shaft and a core having projecting field magnets including poles and coils, bracing members bearing against the sides of the coils and located between adjacent field magnets, and means for holding the bracing members in position comprising annular members mounted on the shaft and connected to the bracing members.

5. In a dynamo-electric machine, a rotary element comprising a shaft and a core having projecting field magnets including poles and coils, bracing members bearing against the sides of the coils and located between adjacent field magnets, annular members mounted on the shaft at the ends of the core, and means connecting the bracing members to the said annular members.

6. In a dynamo-electric machine, an element having projecting poles and coils, coil bracing members applied to the sides of the coils and located between adjacent poles, means for retaining said bracing members in position comprising annular members located at the opposite sides of the poles, and adjustable means connecting the bracing member to said annular members.

7. In a rotary field member, a shaft, a core mounted on the shaft and provided with field magnets comprising poles and field coils, coil bracing members engaging said coils, annular members mounted on the shaft at the ends of the core, and adjustable means connecting each bracing member to said annular members.

In testimony whereof I affix my signature, in the presence of two witnesses.

ROBERT B. WILLIAMSON.

Witnesses:
CHAS. L. BYRON,
ROB. E. HALL.